J. H. RUSBY.
EXTENSION DRILL.
APPLICATION FILED JAN. 7, 1916.

1,246,326.

Patented Nov. 13, 1917.
2 SHEETS—SHEET 1.

WITNESS:
Rob R Mitchel

INVENTOR
Joseph H. Rusby
BY
Augustus B. Stoughton.
ATTORNEY.

J. H. RUSBY.
EXTENSION DRILL.
APPLICATION FILED JAN. 7, 1916.

1,246,326.

Patented Nov. 13, 1917.
2 SHEETS—SHEET 2.

WITNESS:

INVENTOR
Joseph H. Rusby
BY
ATTORNEY.

UNITED STATES PATENT OFFICE.

JOSEPH H. RUSBY, OF NUTLEY, NEW JERSEY.

EXTENSION-DRILL.

1,246,326.

Specification of Letters Patent.

Patented Nov. 13, 1917.

Application filed January 7, 1916. Serial No. 70,766.

*To all whom it may concern:*

Be it known that I, JOSEPH H. RUSBY, a citizen of the United States, and a resident of Nutley, in the county of Essex and State of New Jersey, have invented a certain new and useful Extension-Drill, of which the following is a specification.

Objects of the invention are to provide a compact, reliable, practical and mechanically efficient tool, which may be readily extended to various shaft lengths, to protect the surface of the rotating shaft while providing efficient lubrication, and to dispense with intermediate gears and so increase the working efficiency and avoid increase of producing cost, while preserving mechanical simplicity of design.

The invention will be described in connection with the embodiment of it chosen from other embodiments for the sake of illustration in the accompanying drawings, in which—

Figure 3:
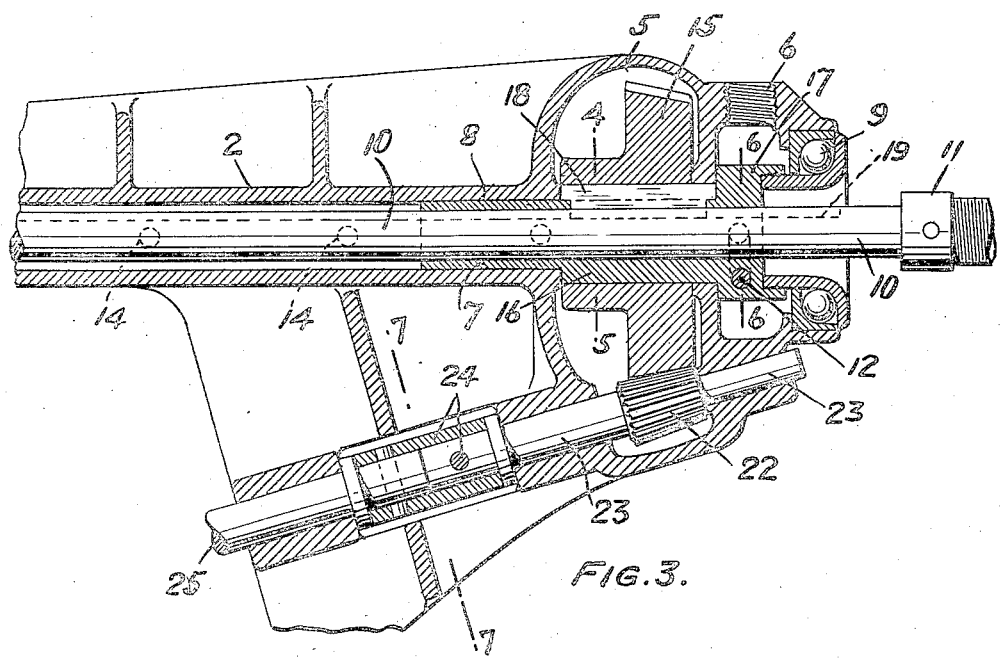
Fig. 3, is a central section, drawn to an enlarged scale, and illustrating novel features of construction.
Figure 5:
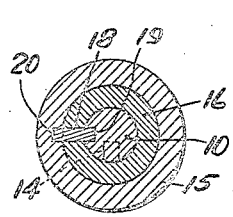
Figure 6:
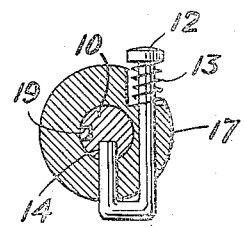
Figure 7:
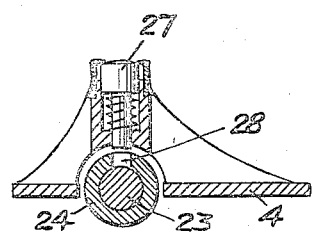

Figs. 5, 6, and 7, are sections on the lines 4—5, 6—6, and 7—7 of Fig. 3.

Figure 4:
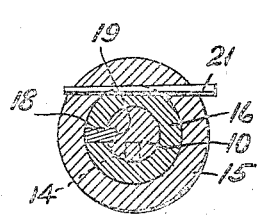
Fig. 4, is a sectional view showing a modification.

In the drawings 1, generally indicates a frame, shown to consist of an open-ended tool shaft housing 2 and a laterally arranged motor housing 3, from the end of which projects a driving shaft housing 4 disposed at an inclination to the tool shaft housing. This frame is provided near the union of said housings 2 and 4, with a gear case 5, a latch case 6, and a sleeve chamber 8. The frame is illustrated as of ribbed construction, which is both strong and light. Within the sleeve chamber and extending past the gear-case 5 and past the latch-case 6, is a sleeve 7, revolubly mounted and held against end-thrust. This sleeve 7 has a bearing in the sleeve chamber 8, in the tool shaft housing 2, and at 9 at the end of this housing 2.
At 9 there is shown a ball or antifriction bearing of which the cone is detachably connected with and carried by the sleeve 7, and of which the cup is carried by the end of the housing 2. Through the sleeve 7, and in splined connection with it is the tool shaft, or spindle 10, which extends into or through the housing 2, but not into contact with its wall. This shaft 10 is movable endwise through, but turns with the sleeve 7, and carries a suitable clutch, of which a part is shown at 11. 12, is a finger-latch carried by and arranged to work through the sleeve 7, and having its operative inturned end normally held by a spring 13, in engagement with any appropriate one of a series of pits 14, formed in the tool shaft 10. The latch is located in the latch chamber 6 and is accessible through an opening in the wall of this chamber 6. By this arrangement the tool shaft 10 may be projected and retracted in respect to the frame and locked in any required position against endwise movement in respect to the sleeve 7, so as to take the tool thrust. 15, is a driven gear encircling and fast on the sleeve 7, and arranged in the gear case 5. The sleeve 7 is shown as of three diameters of relatively increasing size. A notch is cut axially along the portion of the sleeve 16 which is of intermediate diameter and partly into the portion 17 which is of relatively large diameter, and the middle part of this notch is radially slotted clear through, Fig. 5. The part of the spline 18, that works in the spline-way 19 of the tool shaft, passes through this slotted portion of the sleeve. The spline is provided at its ends with shoulders which rest upon the portions of the notch at the ends of the slot, and the portion of the spline beyond the shoulders is either turned off flush with the surface of the sleeve, Fig. 4, or is permitted to extend into a key-way 20, cut in the wall of the center opening of the driven gear 15, Fig. 5. To secure the gear 15, fast upon the sleeve 7, a pin 21 Fig. 4, may be provided this being a modification.

Figure 1:
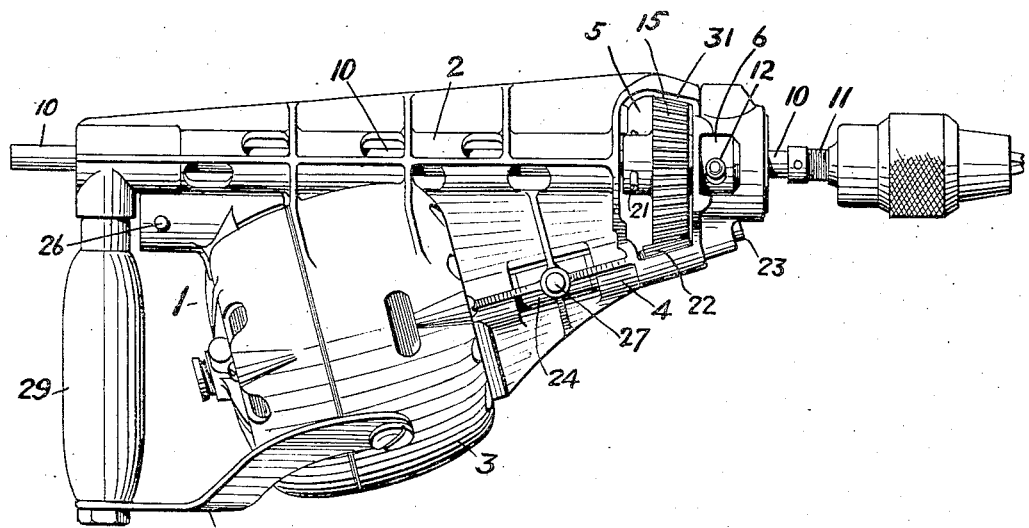
Figure 1, is a side elevation of a tool embodying features of the invention.
Figure 2:
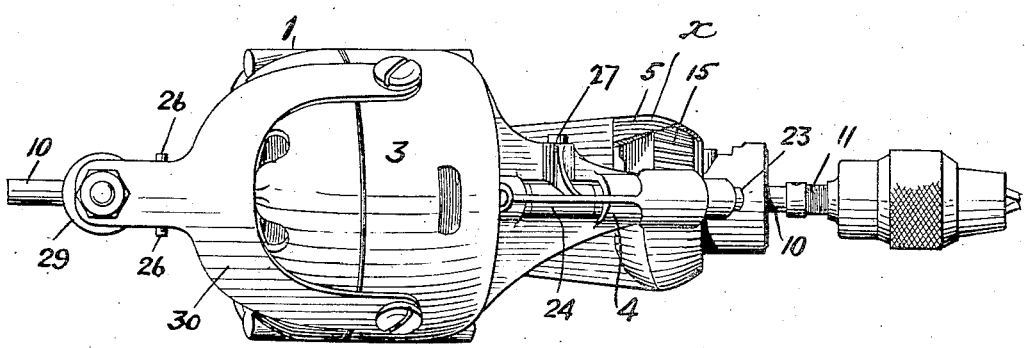
Fig. 2, is a top or plan view of the same.

The described construction and arrangement of spline is simple to manufacture and assemble and the spline is held in place even if the tool shaft be entirely withdrawn from the sleeve and frame. 22, is a driving pinion or gear meshing direct with the driven gear and it is shown as cut on a driving spindle or shaft-section 23, revolubly supported in bearings in the housing 4, and which is connected by a sleeve-and-pin coupling 24, with the stub shaft 25 of a motor, not shown, but arranged in the motor housing 3, and started and stopped by a finger switch 26. 27 is a normally retracted finger pin adapted when pressed to take into a pit 28, in the driving shaft, or more accurately in the coupling 24 thereof, and its purpose is to hold the tool shaft 10 at rest when the chuck 11 is being tightened upon a tool. 29 is a handle projecting from the frame transversely of the tool shaft 10 and it is supported by a strap 30, connected with the motor housing 3. The interior of the gear-case 5, may be filled with grease, and thus excellent lubrication of the sleeve and other accessible parts is insured. A cover plate, a part of which is shown at 4, Fig. 2, is fastened at 31 and serves to retain the grease. The fact that the tool shaft does not, and the sleeve 7 does, run in bearings, is important because the sleeve can be well lubricated, which would be a difficult thing to do in the case of the shaft because it is sometimes moved endwise, and again a turning surface on the tool shaft is soon impaired and worn. This, of course, is true whether the drive shaft 23, 24, 25 and motor are employed for driving driven gear 15, or not. The fact that only two gears 15 and 22 are employed is important, since it is desirable not to waste power or multiply the number of parts.

The tool as a whole is compact, its parts are few and readily made and assembled, and it is well fitted to meet the requirements of operation and use.

Evidently it is not necessary to employ all the features described because some of them are capable of use without the others, but having thus described the invention what I claim is:

1. In an extension drill, the combination of a tool shaft housing, a longitudinally fixed sleeve rotatable in the housing, a latch in the sleeve, and a shaft arranged out of contact with the housing and longitudinally movably splined in the sleeve and provided with a row of depressions adapted to co-operate with the latch.

2. An extension drill comprising the combination of a frame, a longitudinally fixed sleeve rotatable in the frame, a gear on the sleeve, a latch in the sleeve, a spline in the sleeve, a shaft longitudinally movably splined in the sleeve, said shaft having a row of alined depressions, said latch being adapted to co-act with said depressions to secure said shaft in various positions longitudinally relative to said sleeve, and means for rotating said gear.

3. In an extension drill the combination of a tool shaft housing, a longitudinally fixed sleeve rotatable in the housing, said sleeve having a slot through the wall thereof and a shoulder at the end of the slot, a spline arranged in said slot and having a shoulder resting on the shoulder of the sleeve to limit the seating depth of said spline in said slot, means for securing said spline in said seat, and a tool spindle having a spline-way and being longitudinally insertible through the sleeve.

4. In an extension drill the combination of a tool shaft housing, a longitudinally fixed sleeve rotatable in the housing, said sleeve having a slot through the wall thereof and a shoulder at the end of the slot, a spline arranged in said slot and having a shoulder resting on the shoulder of the sleeve to limit the seating depth of said spline in said slot, said spline projecting above said spline-slot, a driving piece on said sleeve, said driving piece being provided with a channel adapted to receive said spline projection for securing said driving piece against rotation on said sleeve, and a tool spindle having a spline-way.

5. An extension drill comprising the combination of a frame, a sleeve provided with a gear wheel and revolubly and endwise immovably mounted in the frame, a tool spindle endwise movable through the sleeve and provided with locking devices for positioning it, a second gear wheel directly in mesh with the first mentioned gear wheel, and means for driving said second mentioned gear wheel.

6. In an extension drill a tool housing provided with a gear case, a gear in said case, a sleeve connected with said gear and extending past said case to retain grease therein, and a shaft through said sleeve and splined thereto for endwise movement out of contact with the grease.

JOSEPH H. RUSBY.